United States Patent [19]
Gillette et al.

[11] 3,903,977
[45] Sept. 9, 1975

[54] SKID STEER VEHICLE WITH CASTER WHEEL

[75] Inventors: Roy A. Gillette; Charles D. Wilson, both of Burlington, Iowa

[73] Assignee: J. I. Case Company, Racine, Wis.

[22] Filed: July 1, 1974

[21] Appl. No.: 484,418

[52] U.S. Cl. .............................. 180/6.2; 280/80 R
[51] Int. Cl.² ....................................... B62D 11/02
[58] Field of Search ........ 180/6.2, 6.66, 6.48, 6.54; 280/80 R, 81 R, 43.23

[56] References Cited
UNITED STATES PATENTS

| | | | |
|---|---|---|---|
| 2,919,928 | 1/1960 | Hoffer | 280/81 R |
| 3,161,418 | 12/1964 | Brennan et al. | 280/81 R |
| 3,444,583 | 5/1969 | Laurel | 180/6.2 X |
| 3,488,064 | 1/1970 | Moe | 280/80 R |

*Primary Examiner*—David Schonberg
*Assistant Examiner*—John A. Pekar
*Attorney, Agent, or Firm*—Dressler, Goldsmith, Clement & Gordon, Ltd.

[57] ABSTRACT

A vehicle having a pair of driven wheels on each side of the body is disclosed herein. The vehicle is steered by varying the speed of the respective pairs of wheels and has a caster wheel on a support which is rotatable on an arm. The arm is movable between raised and lowered positions and the two adjacent rear wheels are above the ground in the lowered position. Latch means are located between the caster wheel support and the arm to maintain the wheel in the maximum raised position when the wheel is in a raised position.

2 Claims, 2 Drawing Figures

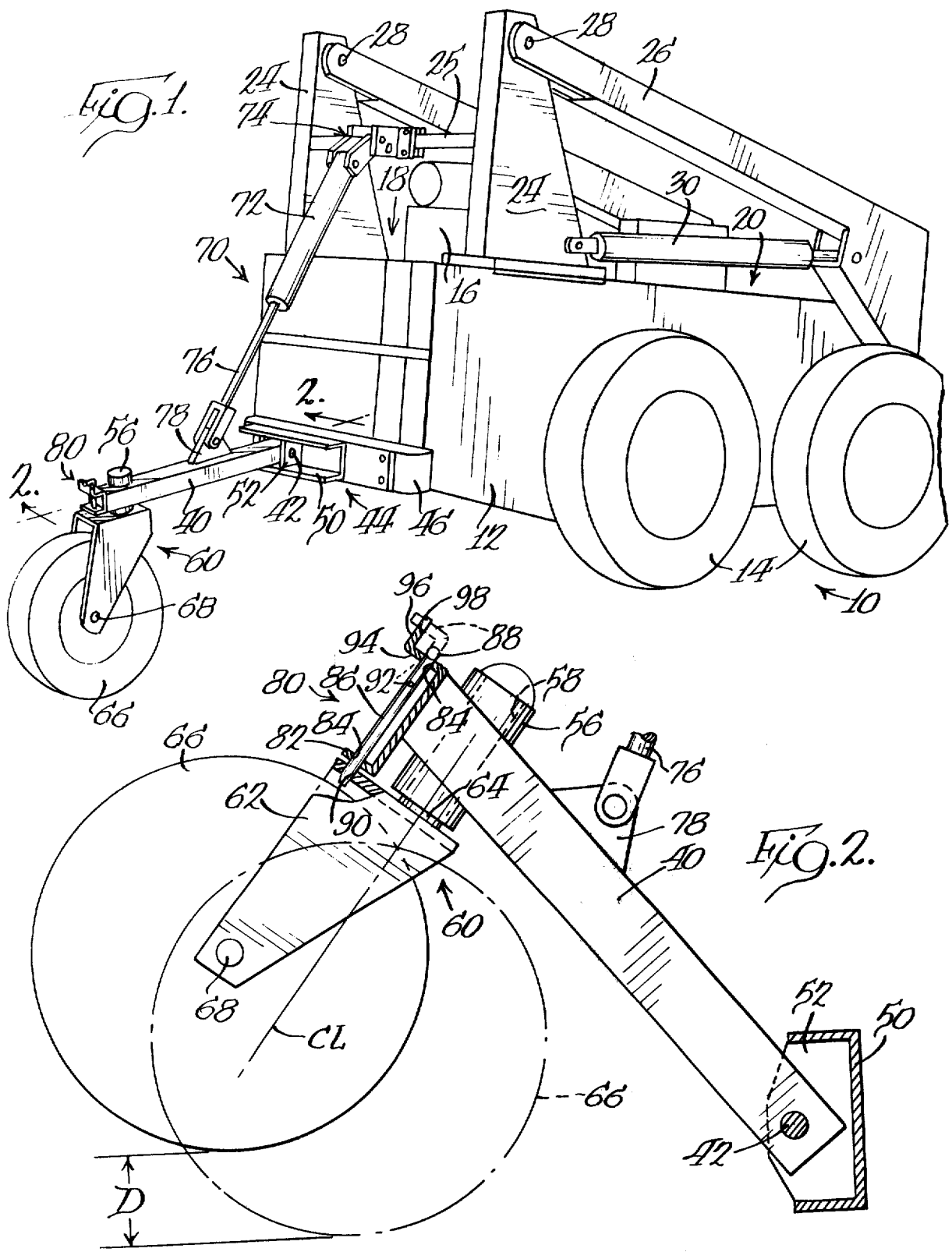

3,903,977

SKID STEER VEHICLE WITH CASTER WHEEL

BACKGROUND OF THE INVENTION

The present invention relates generally to vehicles and more particularly to vehicles of the type that are commonly referred to as skid-steer vehicles. One type of skid-steer vehicle is a small compact unit consisting of a body having two pairs of driven wheels respectively located on opposite sides of the body and a material handling implement supported on the body. In this type of vehicle, the steering is accomplished by varying the speed and/or direction of rotation of the respective pairs of wheels on opposite sides of the body.

In certain instances it has been found desirable to raise two of the wheels above the ground so that the vehicle can be driven and controlled by only two wheels respectively located on opposite sides of the body. To accomplish this, certain types of vehicles incorporate a caster or fifth wheel which is supported on an arm extending from the rear end of the body. The arm is moved between raised and lowered positions by suitable drive means that may be a fluid ram interposed between the arm and the body. The arm supporting the caster wheel is moved to a lowered position by the fluid ram to cause the wheel to engage the supporting structure and raise the rear wheels of the vehicle off the supporting structure. This arrangement is desirable when the vehicle or machine is being operated on soft turf or on hard surfaces, such as concrete floors in warehouses.

In order to provide adequate maneuverability of the unit when the two rear wheels are raised above the ground level, the caster wheel is normally supported for universal rotation about a vertical pivot axis on the arm and the caster wheel is supported on a horizontal pivot axis that is laterally offset from the vertical pivot axis.

To further increase the maneuverability of the unit, the arm supporting the caster wheel is normally made as short as possible to maintain the obstruction extending rearwardly of the vehicle at a minimum. This is particularly important when the arm supporting the caster wheel is in the raised or inoperative position.

It has been found that in certain instances during normal operation of the vehicle or unit with the caster wheel in the raised position, that the ground or terrain may be sufficiently sloped so as to cause engagement of the caster wheel even when it is in the raised position. This arrangement is highly undesirable since the operator may not be aware that the caster wheel is or is about to engage the ground.

While an obvious solution for overcoming this problem would be to either extend the length of the arm so that the caster wheel is at a higher elevation when the arm is in the raised position or provide fluid ram that has a longer stroke so that the arm can be raised a greater distance above the ground at the distal end thereof.

However, neither of these arrangements is practical or acceptable. For example, extending the length of the arm would necessarily increase the length of the obstruction produced by the arm at the rear end of the vehicle and thereby reduce the maneuverability of the unit, particularly when operating in close quarters. Increasing the length of the fluid ram is also not normally practical since this many times would require complicated vertical extensions adjacent the rear end of the vehicle to support the fluid ram at its proper location and provide the necessary extension and retraction to raise the arm the desired distance above ground level.

SUMMARY OF THE INVENTION

According to the present invention, the above-mentioned problem of having the caster wheel engage the ground in the raised position, is minimized by at all times holding the caster wheel at the most elevated position by a simple latch mechanism that prevents rotation of the wheel relative to the supporting arm when the device is in an inoperative position.

The environment for the present invention is a skid-steer vehicle that consists of an elongated body having two pairs of driven wheels respectively located on opposite sides of the body and a material handling unit extending forwardly of the forward end of the body. An elongated arm is pivoted on the rear end of the body and the arm has a socket on the free end thereof that defines a substantially vertical opening.

A wheel support has a pin portion rotatably supported in the socket opening for universal rotation with respect to the vertical axis of the socket opening. A caster wheel is rotatably supported on the wheel support for rotation about a pivot axis that is normal to the vertical axis of the opening and is laterally offset from the vertical axis.

Latch means are positioned between the arm and the wheel support for maintaining the pivot axis of the caster wheel rearwardly of the vertical axis to increase the spacing between the lower edge of the caster wheel with respect to the adjacent supporting structure while the arm is in the raised position.

BRIEF DESCRIPTION OF THE SEVERAL VIEWS OF THE DRAWINGS

FIG. 1 shows a fragmentary perspective view of a skid-steer vehicle with its associated caster wheel in a lowered operative position; and FIG. 2 is a fragmentary sectional view, as viewed along line 2—2 of FIG. 1 showing the caster wheel in a raised position and showing the details of the latch means.

DETAILED DESCRIPTION

While this invention is susceptible of embodiment in many different forms, there is shown in the drawings and will herein be described in detail a preferred embodiment of the invention, with the understanding that the present disclosure is to be considered as an exemplification of the principles of the invention and is not intended to limit the invention to the embodiment illustrated.

FIG. 1 of the drawings generally shows a vehicle 10, which is commonly referred to as a compact, skid-steer loader, having an elongated body 12. Elongated body 12 is supported by two pairs of wheels 14 (only one pair being shown) that are driven by an engine 16 located in an engine space 18 that is defined adjacent the rear end of the body. The body 12 also has a forward space 20 for the operator's legs with a seat (not shown) located between forward space 20 and engine space 18.

Vehicle 10 also includes a pair of uprights or stanchions 24 that extend above body 12 adjacent engine space 18 and stanchions are interconnected by cross member 25. Each upright 24 has a lift arm 26 pivotally supported on the upper end by a pin 28. The respective lift arms 26 are adapted to be pivoted about pins 28 by fluid rams 30 (only one being shown) with the outer ends of lift arms having a material handling unit, such as a bucket loader (not shown), pivoted thereon by further fluid rams.

The vehicle so far described normally incorporates separate hydrostatic drive transmissions between engine 16 and each pair of wheels 14, which are respectively located on opposite sides of body 12. The two hydrostatic drive transmissions each include a variable displacement pump that is driven by engine 16 and supplies fluid to a fluid motor that is coupled to a pair of the wheels. With this arrangement, the speed and/or direction of movement of the vehicle is controlled by varying the speed and/or the direction of rotation of the respective pairs of wheels.

As indicated above, in certain instances it is desirable to have a caster or fifth wheel supported on the rear end of the vehicle which can be moved to an operative position for raising the two rear wheels off the ground. This arrangement is desirable when operating in soft turf or when operating on hard surfaces, such as concrete floors to avoid skid marks on the surfaces.

In other instances when the caster wheel is not required, the entire support mechanism is retracted so that the vehicle can be operated under the normal four wheel drive.

The fifth wheel or caster wheel and its supporting mechanism is generally disclosed in FIGS. 1 and 2 and consists of an elongated arm 40 that has its inner end pivoted about a horizontal pivot axis 42 on a bracket structure 44 that is secured to a rigid beam 46 extending across the lower rear end of body 12. In the illustrated embodiment, bracket 44 consists of a U-shaped channel 50 that has a pair of plates 52 extending between the legs and web of the U-shaped channel 50 to receive and support pin 42 in horizontally aligned openings.

The outer free or distal end of the arm 40 has a vertical socket 56 that defines an opening 58, the axis of which extends substantially perpendicular to the longitudinal dimension of arm 40. Socket 56 supports a caster wheel support 60 consisting of a generally U-shaped bracket 62 that has a pin portion 64 extending therefrom and received into opening 58 in socket 56. Caster wheel 66 is supported on a horizontal pin 68 that extends between the two legs of U-shaped bracket 62.

Arm 40 is adapted to be pivoted about horizontal pivot pin 42 through a fluid ram 70 that consists of a cylinder 72 secured to a bracket structure 74 that is connected to cross member 25 extending between uprights 24. Piston rod 76 of fluid ram 70 is connected to arm 40 through a lug 78 secured to the arm, as by welding. Thus, extension of fluid ram 70 will move caster wheel 66 to its lowered or operative position, as shown in FIG. 1, while retraction of fluid ram 70 will raise caster wheel 66 to its inoperative position shown in FIG. 2.

As can be seen from an inspection of FIG. 2, the horizontal pin 68 which defines a pivot axis that is normal to the axis of socket opening 58, is laterally offset from the center line CL of socket opening 58. This arrangement is necessary for a caster wheel to properly trail the vehicle when the caster wheel is in an operative position, as shown in FIG. 1. However, such an arrangement has a disadvantage when the caster wheel supporting mechanism is in the raised position as shown in FIG. 2. Since the caster wheel support 60 is free to pivot about vertical pivot axis or center CL when it is in an inoperative position, the wheel normally assumes the position shown in dotted lines in FIG. 2. In certain instances, such an arrangement does not provide sufficient clearance between the adjacent ground support and the lower edge of the caster wheel so that it is possible for the caster wheel to engage the ground when the supporting mechanism is in an inoperative position. This situation is highly undesirable since it may result in loss of control of the vehicle.

According to the present invention, additional clearance between the caster wheel and the ground is provided by a simple latch means or mechanism that can readily be incorporated into existing units without any significant modification thereof. The latch means consists of a minimum number of parts that are readily available and can be incorporated into an existing unit in a matter of minutes.

Latch means 80 is located between arm 40 and wheel support 60 and maintains the horizontal pivot axis, defined by pin 68, rearwardly of the vertical pivot or center line CL for socket opening 58 to thereby increase the spacing between the lower edge of the caster wheel with respect to adjacent supporting structure for the vehicle while the supporting arm 40 is in raised or inoperative position.

More specifically, latch means 80 consists of a generally U-shaped bracket 82 that is fixedly secured, as by welding, to the rear free end of arm 40. The spaced legs of U-shaped bracket 82 have openings 84 therein which are aligned with each other and slidably receive a pin 86. Pin 86 has a portion 88 that extends transversely to the axis thereof and defines an abutment which can be used to hold the pin in the locked position when it is either in the lower position or in the raised position. In the lowered position, illustrated in FIG. 2, a free end of pin 86 extends through an opening 90 in the web portion of U-shaped bracket 82, which forms part of wheel support 60. In this position, the wheel 66 is held at a maximum raised or clearance position with respect to the ground level by having horizontal pin 68 located rearwardly of center line CL.

Preferably, latch pin is fixedly held in either the raised or lowered position to insure that the caster wheel remains locked in the lowered position at all times and also insure that the latch pin 86 does not move to a locked position when the caster wheel is in a lowered or operative position. This again is accomplished by an extremely simple mechanism consisting of a simple cotter pin cooperating with pin 86.

For this purpose, pin 86 has a pair of axially spaced openings 92, both of which are adapted to receive a cotter pin 94. The upper opening 92 is positioned so as to be spaced from the transverse abutment 88 by an axial dimension which is substantially equal to the thickness of the leg of U-shaped channel 82 so that the cotter pin 94 will prevent the free end of pin 86 from being withdrawn from opening 90 when the latch means 80 is in the locked or lowered position.

Pin 86 is held in a raised position by a leg 96 extending upwardly from channel 82 with a recess 98 on the upper free edge of leg 96 which receives transverse abutment 88 when latch pin 86 is in the raised position. After the latch pin 86 has been moved to the dotted line position shown in FIG. 2, cotter pin 94 is inserted into the lowermost opening 92 to prevent transverse abutment 88 from being removed from recess 98.

Thus, it can be seen that the present invention provides an extremely simple and inexpensive mechanism that allows for producing additional clearance between a caster wheel and the ground support when the caster wheel is in an inoperative position. The entire mechanism can readily be installed into an existing machine at a minimum cost in a very short period of time.

What is claimed is:

1. A skid-steer vehicle including an elongated body having a forward end and a rear end with a pair of driven wheels on each side of said body, a material handling unit on said body extending forwardly of said forward end; an elongated arm; pivot means on said rear end supporting said arm for vertical pivotal movement about a horizontal pivot with said arm extending rearwardly of said rear end and having an outer free end; a socket on said outer free end of said arm, said socket defining a socket opening having a substantially vertical axis; a wheel support having a pin portion rotatably supported in said socket opening for universal rotation with respect to the axis of said socket opening, said wheel support also having a latch opening therein; a caster wheel rotatably supported on said wheel support for rotation about a pivot axis normal to said axis of said opening, said pivot axis being laterally offset from said axis of said opening; means connected between said body and said arm for pivoting said arm between raised and lowered positions; and latch means connected between said arm and said wheel support for maintaining said pivot axis rearwardly of said axis of said opening to increase the spacing between the lower edge of said caster wheel with respect to adjacent supporting structure for said vehicle while said arm is in the raised position, said latch means including a generally U-shaped bracket fixed to said arm and having spaced generally parallel upper and lower legs, each of said legs having an opening therein and said openings in said legs being aligned with the latch opening in said wheel support, means defining a flange on the upper leg of said bracket, said flange being spaced from the opening in said upper leg and said flange having a recess therein, said latch means further including a generally L-shaped latch pin including first and second legs, the first leg of said latch pin having an axial dimension sufficient to extend through the openings in the legs of said bracket and through the latch opening in said wheel support when the second leg of the latch pin rests upon the upper leg of said bracket to thereby retain said arm in the raised position, the lower end of the first leg of said latch pin being spaced from the latch opening in said wheel support when the second leg of the latch pin is positioned in the recess in the flange on the upper leg of said bracket, whereby said wheel support is free to pivot relative to said arm when said arm is in the lowered position.

2. A skid steer vehicle as defined in claim 1, further including means for holding said pin in released and latched positions.

* * * * *